(12) United States Patent
George et al.

(10) Patent No.: US 10,944,706 B2
(45) Date of Patent: Mar. 9, 2021

(54) DYNAMIC DETERMINATION OF DATA-TRANSMISSION CHARACTERISTICS BASED ON HISTORICAL DATA ACCESSES

(71) Applicant: Adobe Inc., San Jose, CA (US)

(72) Inventors: William Brandon George, Pleasant Grove, UT (US); Kevin Gary Smith, Lehi, UT (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/419,259

(22) Filed: May 22, 2019

(65) Prior Publication Data

US 2020/0374248 A1 Nov. 26, 2020

(51) Int. Cl.
 *H04L 12/58* (2006.01)
 *G06N 20/00* (2019.01)
(52) U.S. Cl.
 CPC ............ *H04L 51/08* (2013.01); *G06N 20/00* (2019.01); *H04L 51/02* (2013.01)
(58) Field of Classification Search
 CPC ................................ H04L 51/08; G06N 20/00
 See application file for complete search history.

(56) References Cited

U.S. PATENT DOCUMENTS

| 8,688,557 | B2 * | 4/2014 | Rose | G06Q 40/06 705/36 R |
| 10,469,664 | B2 * | 11/2019 | Pirat | H04L 51/04 |
| 2013/0041716 | A1 * | 2/2013 | Taylor | G06Q 30/00 705/7.29 |
| 2017/0180554 | A1 * | 6/2017 | McCormack | H04M 3/5191 |

OTHER PUBLICATIONS

"Adobe Experience Cloud Launch", May 2, 2018.
"Keep customers engaged. Every step of the way.", www.adobe.com/lu_en/marketing/marketo.html, Sep. 12, 2018.

* cited by examiner

*Primary Examiner* — Nasser M Goodarzi
*Assistant Examiner* — Adil Ocak
(74) *Attorney, Agent, or Firm* — Kilpatrick Townsend & Stockton LLP

(57) ABSTRACT

This disclosure relates to dynamic determination of data-transmission characteristics based on historical data accesses. For example, some embodiments include accessing a content stream having (i) a first content item and a second content item to be provided to one or more user devices associated with a user and (ii) a trigger condition for providing the second content item. In addition, some embodiments include detecting that the first content item has been consumed at the one or more user devices through a first communication channel and, further, determining that the trigger condition has been met. A machine-learning model inputs action data to determine a second communication channel from among two or more available communication channels. In some cases, the second content item is triggered to be delivered via the second communication channel, responsive to the first content item being consumed and the trigger condition being met.

20 Claims, 6 Drawing Sheets

DYNAMIC DETERMINATION OF DATA-TRANSMISSION CHARACTERISTICS BASED ON HISTORICAL DATA ACCESSES

TECHNICAL FIELD

This disclosure generally relates to intelligent and dynamic data transmission. More specifically, but not by way of limitation, this disclosure relates to incorporating machine learning into characteristics of transmissions, resulting in dynamic determination of data-transmission characteristics based on historical data accesses.

BACKGROUND

In various fields, automated data transmission is key to the timely dissemination of information. For example, and not by way of limitation, timely data transmission is useful in general electronic communications, enterprise software management, and internal business processes. Data can be delivered through various mechanisms, such as email, network messaging services, telephone, or via a web page. When data is not delivered in a timely manner, computing devices and applications operate based on outdated information and, as a result, enterprise software malfunctions, business processes break down, and emergencies are mishandled. If a computing device fails to receive timely information, a user of the computing device remains uninformed, as well as unaware of or unable to assist with a resulting malfunction or other event.

Some existing systems of data transmission utilize information streams, each of which leads a user toward an end goal of the data distributor. An information stream is a set of content associated with specific delivery mechanisms and a sequence describing an order in which the content is delivered. For example, an information stream includes a set of emails and planned telephone calls with established content, scheduled to be sent according to the sequence, typically in a cyclical manner (e.g., according to a weekly cycle). Each piece of content in the information stream is associated with a specific communication channel (e.g., email, telephone call), and the sequence determines the order in which the content is delivered.

Unfortunately, while existing information streams are powerful tools in many respects, information streams have limitations as well. Primarily, points of contact typically occur offline, such as via telephone or email, while user actions based on interest in information conveyed in the information streams often occur online. This creates a disconnect between offline activities and online activities, such that a user performs a task online but does not see a further communication until checking his or her email, for example. Further, given the cyclical nature of existing information streams, that email may not come for days after the user performs a related action, which can risk a loss of user interest. This disconnect can hinder the distribution of data, for instance, by failing to take advantage of a user's engagement when that user is online.

SUMMARY

Certain embodiments involve dynamic determination of data-transmission characteristics based on historical data accesses. For example, one embodiment is a method in which one or more processing devices perform operations. The operations include accessing a content stream having (i) multiple content items to be provided to one or more user devices associated with a user and (ii) a trigger condition for providing at least one of the multiple content items. The operations further include detecting that a first content item of the multiple content items has been consumed at the one or more user devices through a first communication channel and, further, determining that the trigger condition has been met. A machine-learning model inputs action data, describing actions by the one or more user devices, to determine a data-transmission characteristic. More specifically, the machine-learning model determines a second communication channel from among two or more available communication channels for transmission of a second content item of the multiple content items. The operations further include triggering the second content item to be delivered via the second communication channel, responsive to the first content item being consumed and the trigger condition being met.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
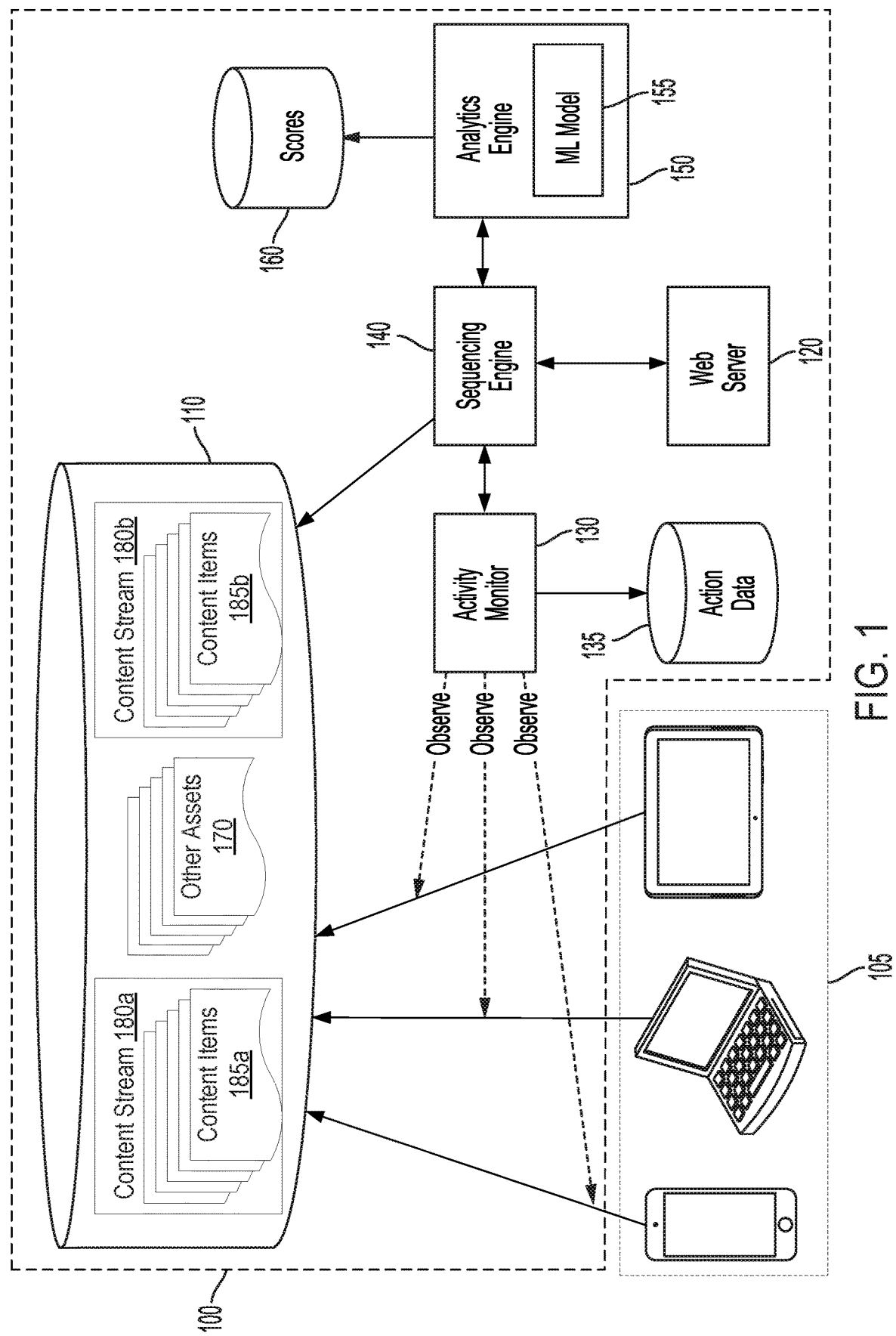
FIG. 1 depicts an example of a communications flow for dynamically determining characteristics of the transmission of content items in a content stream, according to certain embodiments of the present disclosure.

The present disclosure includes systems and methods for dynamically distributing data based on historical activity, potentially utilizing machine learning. Certain embodiments described herein distribute data to each user device based on historical activity performed by a group of devices related to a user, and as a result, users receive data in a manner that is best suited to lead those users to successful use of that data. Further, to this end, certain embodiments utilize one or more machine-learning models to map action data to delivery characteristics, such as a content stream of information, delivery times, or communication channels personalized for the user.

The following non-limiting example is provided to introduce certain embodiments. In this example, a transmission system accesses a content stream that includes multiple content items and a trigger condition, such as a link in the email being clicked or otherwise selected. A first content item is configured to be provided to a user device associated with a user, and a second content item is configured to be provided to the user device if the trigger condition is satisfied. For instance, a content stream designed for facilitating a software upgrade in an enterprise environment includes first and second content items for leading a user to prepare his or her computer for the upgrade process. The first content item describes various steps in the upgrade process (e.g., warnings of system unavailability, restarts, or other expected occurrences during the upgrade) and a link that is accessible via a user device to confirm shutdown of certain applications that will be impacted by the upgrade. In this example, the trigger condition is selection of the link in the first content item. The second content item, which is configured to be delivered via a communication channel that is not yet determined at the time the first content item is delivered, includes a final reminder that the upgrade is beginning, along with a warning that the user may lose work if the certain applications are not closed.

Continuing with this example, the transmission system detects that the first content item has been consumed at the user device through a first communication channel. For instance, the transmission system detects whether a first content item transmitted via an email channel has been opened (i.e., consumed). The transmission system determines that the trigger condition has been met, such as by detecting selection of the link in the email. The transmission system also determines, based on action data describing how and when the various content items in the content stream are consumed via the user devices, a second communication channel from among two or more available communication channels for the second content item. To do so, the transmission system uses a machine-learning model to determine some characteristics of delivery of the multiple content items. For instance, the transmission system uses a machine-learning model that has previously been trained to map action data to a selection of a communication channel, to identify the second communication channel. The transmission system applies the machine-learning model to action data including an indication of the consumption of the first content item and indications of other actions that have been performed via the user devices. The machine-learning model identifies the second communication channel as having a sufficiently high probability of success (e.g., compliance with the software upgrade process). The transmission system delivers the second content item via the second communication channel.

In this manner, certain embodiments dynamically determine a communication channel by which the second content item is delivered, for instance, based on a pre-trained machine-learning model. As a result, user engagement is maintained based on activities performed via a computing device rather than based only on predetermined communications channels and cycles. Further, in some embodiments, a content item is not permanently coupled to a specific communication channel (e.g., email) and can thus be delivered through a communication channel deemed likely to engage the user most effectively.

Conventional mechanisms of data transmission are cycle-based, and each piece of content is pre-coupled with a delivery mechanism, such as delivery via an email or telephone call. As a result, even if a user is currently browsing online via a computing device and could therefore easily consume data in the device's online browsing environment, content might be sent to the user's email address or a telephone call could be initiated. Embodiments described herein address this problem by decoupling content from the delivery mechanism of that content, and by using machine-learning techniques to dynamically determine transmission characteristics, such as the timing and communication channel of content. For instance, given an established set of content items (e.g., pieces of content to be delivered), embodiments of the invention utilize machine learning to determine when and how to deliver such content items. In some cases, dynamically determining timing or a communication channel improves efficiency of the delivery, such as by reducing a time delay before receipt of the content. Additionally or alternatively, dynamically determining timing or a communication channel reduces network traffic, by reducing repeated messages to a particular computing device. As a result, a computing device receives content in a manner that is more likely to lead to timely consumption and desired use of that content.

As used herein, the term "content item" refers to established information to be communicated to a user. While a content item is stored in one or more formats, the content item need not be conveyed in the same format in which the content item stored. For instance, a content item is stored as text but is eventually delivered in image format as an infographic or is eventually delivered via voice mail in audio format. Thus, it will be understood that a "content item" is an item of information capable of being conveyed in one or more formats.

As used herein, the term "trigger condition" refers to a requirement that, when met, triggers an activity related to a content stream. In other words, a trigger condition maps a specific action or set of actions, or lack of a specific action or set of actions, to a specific reaction such that, when a trigger condition is met by the occurrence of the specific action or set of actions, the specific reaction is initiated.

As used herein, the term "content stream" refers to a set of content items associated with a set of one or more rules directing delivery of the content items. For example, a rule of a content stream defines a trigger condition indicating under what circumstances a specific content item of the content stream is delivered. Additionally or alternatively, a rule indicates a default order or default timing for delivery of the content items in the content stream. As described herein, however, timing is dynamic in some embodiments.

As used herein, the term "chatbot" refers to a conversational agent designed to provide real-time guidance. For instance, a chatbot is embedded in a website by way of injecting or otherwise writing, into the website, code implementing the chatbot. In some embodiments, a chatbot utilizes natural language processing, potentially combined with artificial intelligence, to conduct a conversation via auditory or textual means. For example, a chatbot is enabled to answer a user's question in real time (e.g., a reasonable period of time for a conversational response) or to respond to a statement posed by a user in real time.

As used herein, the term "digital agent" refers to a virtual assistant designed to provide real-time guidance. For instance, a digital agent is embedded in a website by way of injecting or otherwise writing, into the website, code implementing the digital agent. For example, and not by way of limitation, a digital agent is an instructional overlay or a coach mark added to a web page to highlight aspects of the web page that are relevant to a user. For another example, a digital agent is integrated into a website and provides a guided tutorial of the website. In some cases, a chatbot is a type of digital agent.

As used herein, the term "online" with respect to communications or other activities refers to occurrence during an interactive computing session, such as on a website or a mobile application. An example of an online activity is watching a video on a website, and an example of an online communication is a communication by way of a chatbot or digital agent embedded in a website. In contrast, as used herein, the term "offline" with respect to a communication or activity refers to occurrence outside of an interactive computing session. Examples of offline communications include emails and telephone calls.

As used herein, the term "communication channel" refers to a mechanism by which information, such as a content item, is conveyed. For example, communication channels include both electronic and non-electronic modes of communication. More specifically, and not by way of limitation, communication channels include telephone calls, emails, voice mails, and web page integration (e.g., via chatbot or digital agent).

As used herein, the term "delivery" with respect to a content item refers to the act of delivering the content item to a virtual or physical location such that the content item is retrievable by a recipient user. For example, an email is deemed delivered upon arrival at a virtual inbox of the recipient, a voice mail or telephone call is deemed delivered when a voice message is left and retrievable by the recipient, and content integrated into a web page is deemed delivered upon being made available for the recipient's future visit to the web page. Thus, for the purposes of certain embodiments described herein, a content item is assumed to be delivered upon being transmitted.

As used herein, the term "consumption" with respect to an asset, such as a content item, refers to receipt of the asset by a user device. For example, consumption could refer to the user's reading, hearing, or viewing the asset, as appropriate for the format of the asset. In some embodiments, when a user device opens an email representing a content item, it is then assumed that the content item has been consumed by the user device and by the user associated with the user device. Additionally or alternatively, when a content item is represented on a web page (e.g., displayed text, video playback, audio playback), some embodiments assume that the content item is consumed when a user device accesses the web page.

As used herein, the term "action data" refers to a set of data associated with a user and further associated with a set of user devices of the user, where the action data describes a history of activities related to the user devices of the user. In some embodiments, action data includes indications of data accesses as well as, potentially, other activities related to the user devices. For example, action data includes indications of activities performed via a computing device by which the user consumed content items from one or more content streams. For another example, action data includes indications of consumption of content items as well as indications of which content items were sent to the user. In some embodiments, action data is input into a machine-learning model to dynamically determine when or through what communication channels content items are delivered to the user.

FIG. 1 depicts an example of a communications flow in a transmission system 100 for dynamically determining characteristics of the transmission of content items in a content stream, according to certain embodiments of the present disclosure. Specifically, for instance, certain embodiments of the transmission system 100 dynamically determine timing or a communication channel for delivery of a content item 185. As shown in FIG. 1, an example of the transmission system 100 described herein includes an asset store 110, a web server 120, an activity monitor 130, a sequencing engine 140, and an analytics engine 150. In some embodiments, these elements are distributed across one or more servers, such that the transmission system 100 acts as a cloud service for distributing data, specifically content items, to user devices 105. Each of the asset store 110, the web server 120, the activity monitor 130, the sequencing engine 140, and the analytics engine 150 are implemented as hardware, software, or a combination of hardware and software. For instance, each of such elements is implemented as program code stored in memory and executable by a computer processors, or each of such elements is implemented as a specialized hardware circuit installed on a server. It will be understood by one skilled in the art that various combinations of hardware and software are supported by this disclosure.

In FIG. 1, the asset store 110, the web server 120, the activity monitor 130, the sequencing engine 140, and the analytics engine 150 are shown separately for illustrative purposes only, and it will be further understood that these elements are combinable or further divisible. For example, in some embodiments, the activity monitor 130 and the sequencing engine 140 are integrated together as common program code executable by a processing device. Thus, although some operations may be associated with a certain element (e.g., the activity monitor 130) in this disclosure, it will be understood that the distribution of operations among the asset store 110, the web server 120, the activity monitor 130, the sequencing engine 140, and the analytics engine 150 changes from one embodiments to another.

Generally, the asset store 110 maintains one or more assets 170, such as content stream 180a and content stream 180b (referred to collectively herein as "content streams 180") or other assets 170. For example, and not by way of limitation, the asset store 110 is one or more database tables, one or more text files, or other structures capable of storing organized assets 170 as described herein.

In some embodiments, a content stream 180 includes one or more content items 185 along with a set of rules relating to delivery of the content items 185. More specifically, for instance, content stream 180a and content stream 180b (referred to collectively herein as "content streams 180") respectively include content items 185a and content items 185b (referred to collectively herein as "content items 185"). In some embodiments, the set of rules together define a dynamic sequence in which the content items 185 are delivered to a user. In some embodiments, the content items 185 have a default sequence, and the rules determine dynamic changes to that default sequence based on trigger conditions. A rule determines an aspect of the sequence in which the content items 185 of the content stream 180 are delivered to the user device. For instance, a rule provides that, if a first content item 185 has been consumed by the user device according to the activity monitor 130, where the consumption of the first content item 185 is a trigger condition, then the next content item 185 to be sent to the user device is a second content item 185, and otherwise (i.e., if the trigger condition is not met), the first content item 185 is re-sent to the user device. A trigger condition is a requirement that, if met, determines which content item 185 is delivered to the user device next. For example, and not by way of limitation, a trigger condition requires that a specific content item 185 is read or otherwise consumed, that a specific content item 185 has not been read or otherwise consumed, that a video is watched online, that a video has not been watched online, that the user interacts with or mentions a specific entity (e.g., an entity associated with the content stream 180) on social media, or that the user fails to interact with or mention the specific entity on social media.

Certain embodiments utilize multiple content streams 180 such that, at a given time, each set of user devices associated with a single user is further associated with a corresponding content stream 180. More specifically, in certain embodiments, while a content stream 180 is associated with one or more multiple sets of user devices 105 of one or multiple users, each user's devices 105 are associated with only a single content stream 180 at a time. The user need not be aware of his or her associated content streams 180; in some embodiments, however, the content items 185 delivered to the user devices are selected from the content stream 180 associated with the user. Further, in some embodiments, the transmission system 100 is enabled to switch user's association from a first content stream 180*a* to a second content stream 180*b* as described herein, thereby switching the association for the user's associated devices 105, thus causing the user devices 105 to receive content items 185 from the second content stream 180*b*.

In some embodiments, the web server 120 provides and services a website and, further, is configured to present content items 185 or other assets 170 on the website as described herein. More specifically, for example, the web server 120 is an application configured to access data and code for servicing the website, where such data and code are run by one or more computer processors to provide the website. For another example, the web server 120 is a hardware server maintaining, in memory, data and code for the website and having a processor configured to run the code in association with the data to provide the website. It will be understood that various configurations exist for a web server 120 and that one or more of such configuration is usable for the web server 120 discussed herein.

In some embodiments, the asset store 110 maintains additional assets 170 separate from the content streams 180. For example, and not by way of limitation, the asset store 110 includes a video to which a content item 185 links, or the asset store 110 maintains other data useable in conjunction with a website associated with the transmission system 100. Thus, in some embodiments of the invention, the web server 120 has access to the asset store 110 to enable presentation of the assets therein on the website.

In some embodiments, for each user device 105 known to the transmission system 100, the activity monitor 130 detects access by the user device to assets 170, such as content items 185. More specifically, for instance, for each user, the activity monitor 130 detects access by a set of devices 105 associated with the user. The association can be established in various ways. For example, and not by way of limitation, the user has logged into the website from each such device 105, and thus, the activity monitor 130 has associated each such device with the user. Based on the association of the user to a set of devices 105, certain embodiments are enabled to track the user's activities. For instance, the activity monitor 130 is in communication with the web server 120, such as by reading a log of the web server 120, such that the activity monitor 130 determines whether a device 105 of the user accesses content items 185 on the website. For another example, personnel (e.g., people using the transmission system 100) log completed telephone calls in which information in a content item 185 was communicated, and the activity monitor 130 has access to the resulting log. For another example, the activity monitor 130 receives a notification each time an email incorporating a content item 185 is opened. It will be understood that various other mechanisms exist for verifying that a content item 185 has been consumed (e.g., read, watched, or heard), and the activity monitor 130 utilizes appropriate technologies to do so.

In some embodiments, each user receiving data through the transmission system 100 is associated with a set of devices 105 in the transmission system 100. Throughout this disclosure, it will be understood that activities detected as performed by the user are, more specifically, detected as performed by the set of devices 105 associated with the user. Further, action data 135, a content stream 180, or other data associated with a user is further deemed associated with the set of devices 105 of the user.

In some embodiments, the activity monitor 130 stores action data 135 describing historical activities related to user devices 105 of the user. More specifically, for instance, the activity monitor 130 stores as action data 135 a set of indications including an indication of each consumption of content item 185 deemed to be by the user, for instance, due to the consumption having taken place at one of the devices 105 associated with the user. As described above, a content stream 180 is associated with a set of rules that determine an order of the content items 185. In some embodiments, these rules are applied based on the action data 135. Thus, in some embodiments, the action data 135 associated with a user includes appropriate information for evaluation of the rules associated with the applicable content stream 180 assigned to the user.

Although devices 105 of only a single user are shown in FIG. 1, it will be understood that an embodiment of the invention is applicable to multiple users. In that case, each user is associated with a set of devices 105, and for each user, the activity monitor 130 monitors access to the content items 185 from the associated devices 105. As such, in some embodiments, the activity monitor 130 stores action data 135 describing activities of each user.

In some embodiments, the sequencing engine 140 schedules and initiates delivery of content items 185 in the content stream 180 associated with a user device. As described above, rules associated with the content stream 180 determine an order of the content items 185 with respect to the user, specifically, for instance, based on the action data 135 associated with the user. In certain embodiments, the sequencing engine 140 applies such rules to select the next content item 185 to be delivered to the user via a device 105 of the user. Further, based on the action data 135, the sequencing engine 140 determines a time or communication channel for delivery of the next content item 185 in some embodiments.

In some embodiments, the time or communication channel of a content item 185 is a dynamic characteristic based on application of the rules to the action data 135 associated with a user or, in other words, based on historical activity of the devices 105 associated with the user. To this end, some embodiments of the sequencing engine 140 consult the analytics engine 150, by providing the analytics engine 150 with the action data 135 representing the user. In response, the analytics engine 150 provides an indication of a time at which deliver the next content item 185 or communication channel by which to deliver the next content item 185, based on the action data 135. Thus, the selected time or communication channel is personalized to the user.

In some embodiments, the analytics engine 150 takes action data 135 associated with a user as input and outputs an indication of at least one of the following: a specific content stream 180, which need not be the current content stream 180 assigned to the user; a time at which to deliver a content item 185; and a communication channel by which to deliver a content item 185. To this end, some embodiments of the analytics engine 150 incorporate a machine-learning (ML) model 155, which can be, for example, a regression model, a random forest, a decision tree, or a neural network. After being trained, the ML model 155 maps action data 135 to at least one of a content stream 180, a time, and a communication channel. For example, and not by way of limitation, a first embodiment of the ML model 155 outputs a set of scores 160 including a corresponding score 160 for each available content stream 180, a second embodiment outputs a set of scores 160 including a corresponding score 160 for each available absolute or relative time, and a third embodiment of the ML model 155 outputs a set of scores 160 including a corresponding score 160 for each available communication channel. In general, within each such set of scores 160, the highest score 160 is deemed a recommendation of the associated content stream 180, time, or communication channel. In some embodiments, the ML model 155 provides multiple such sets of scores 160 corresponding to two or more of content streams 180, times, and communication channels, or multiple ML models 155 are used with a single set of scores output per ML model 155. It will be understood by one skilled in the art that multiple variations are possible to achieve the operations described herein.

In some embodiments, prior to or concurrent with operation of the ML model 155, the ML model 155 is trained on training data. In some embodiments, to train the ML model 155 to provide a specific output (e.g., scores 160 of communication channels), the training data includes multiple training sets, where each training set includes action data 135 and a value for the output. More specifically, for each training set, the communication channel indicated is the desired, or correct, communication channel to receive the highest score 160 given the associated action data 135. For instance, if the ML model 155 is being trained to output scores 160 of communication channels, then the ML model 155 is trained on instances of action data 135 paired with corresponding indications of communication channels. One of skill in the art will understand how to train the ML model 155 to operate as described herein. As a result of training, in some embodiments, the ML model 155 maps action data 135 to the one or more outputs for which the ML model 155 was trained, for instance, scores 160 of content streams 180, scores 160 of times, or scores 160 of communication channels. Use of the output of the ML model 155 will be described in more detail below.

Figure 2:
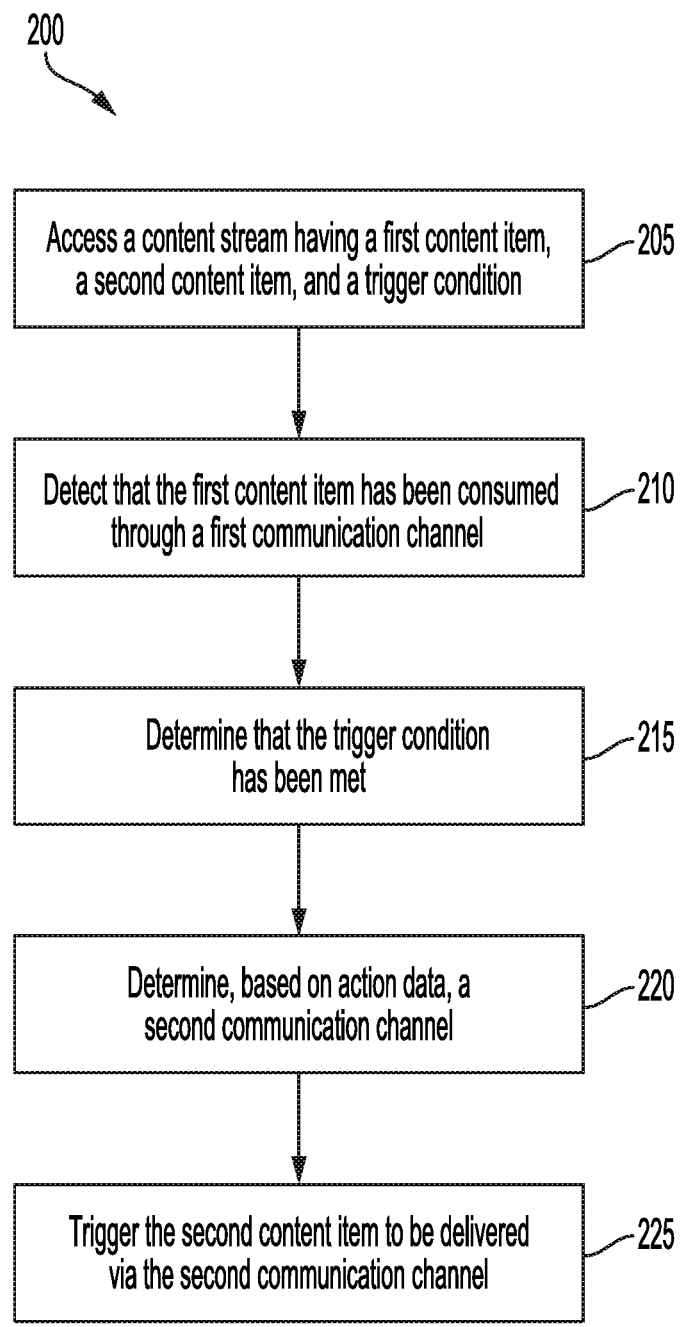
FIG. 2 depicts an example of a method of dynamically determining characteristics of the transmission of content items in a content stream, according to certain embodiments of the present disclosure.

FIG. 2 depicts an example of a process 200 for dynamically determining characteristics of the transmission of content items 185 from one or more content streams 180, according to certain embodiments of the present disclosure. More specifically, FIG. 2 demonstrates an embodiment in which the sequencing engine 140 dynamically determines a communication channel through which a content item 185 is delivered. Additionally or alternatively, however, the sequencing engine 140 selects a time for sending a content item 185, or the sequencing engine 140 selects a content stream 180 from which the next content item 185 is to be selected.

Prior to the beginning of this process 200, a user and the associated set of devices 105 are assigned to a content stream 180. In some embodiments, each content stream 180 represents a presumed state of a user and of the associated devices 105, and the user and associated devices 105 are assigned to the content stream 180 that represents that state. As a result, the assigned content stream 180 is associated with both the user and the devices 105 of the user, such that content items 185 in that content stream 180 are delivered to the user by way of the user's devices 105 as described herein.

For instance, in the above example of leading the user toward preparing his or her computer for an upgrade, the user is assumed to be in a first state of users whose computers are deemed not ready for the upgrade. To further this example, a second state exists for users whose computers are deemed ready for the upgrade. In some embodiments, each state is associated with a content stream 180, where that content stream 180 includes content items 185 designed for users in the associated state. Thus, in this example, a first content stream 180 associated with the first state is applied to users whose computers are not deemed ready, and content items 185 in that first content stream 180 are directed to prompt each user to ready his or her computer. In contrast, a second content stream 180 is applied to users whose computers are deemed ready, and content items 185 in that second content stream 180 are directed to thank users for their cooperation and to remind those users to keep their computers powered on during a designated upgrade period. For another example, a first state represents new potential customer, while a second state represents an interested potential customer. A first content stream 180 applicable to the first state includes content items 185 designed to interest each new potential customer (i.e., each user assigned to the first content stream 180), and a second content stream 180 applicable to the second state includes content items 185 designed to convert an interested potential customer into an actual customer.

Although the example of content streams 180 for facilitating an upgrade is referred to repeatedly herein, it will be understood that content streams 180 can be directed to various purposed. For example, in some embodiments, a transmission system 100 is used to nurture leads, such as in business-to-business communications. In a conventional information stream, when a trigger condition requires a user device to access a video online, and when a potential customer activates the trigger by watching the video on a web page, an email is then transmitted to the user's email address or a salesperson calls the user. At best, the user must wait for the next contact before moving forward. However, due to the cyclical nature of the delivery of communications, the next contact may not occur for days, and the user is likely to lose interest or exit the online environment in the meantime. In contrast, certain embodiments described herein utilize machine learning to determine content stream characteristics, such as a communication channel or a timeframe of communication, that are likely to move the user closer to achieving a desired purpose, such as preparing a machine for upgrade as described in an above example. More specifically, for instance, as soon as the user finishes watching the video online, an example of a transmission system 100 using machine-learning techniques determines that the next content item should be delivered as a chatbot injected into the web page currently provided via the user device, thereby providing content to the user device while the user is engaged with the website.

As shown in FIG. 2, at block 205, the process 200 involves accessing a content stream 180 having a first content item 185, a second content item 185, and a trigger condition. More specifically, for instance, the sequencing engine 140 accesses the content stream 180 currently associated with a user. As a result, the transmission system 100 is able to select one or more content items 185 from the content stream 180 as needed to send such content items 185 to the user.

At block 210, the process 200 involves detecting that the first content item 185 has been consumed, such as by being read, watched, or heard. For example, and not by way of limitation, if the first content item 185 was sent in the form of an email, then a read receipt for the email is used to detect consumption. For another example, in some embodiments, if the first content item 185 was delivered online as content embedded into a web page, then an indication that the user has visited the web page confirms that the content item 185 has been consumed. It will be understood by one skilled in the art that the mechanism of detecting consumption depends on how the content item 185 was delivered to the devices 105 of the user, and that various such mechanisms exist and are useable with various embodiments. In some embodiments, the activity monitor 130 detects consumption of the first content item 185. As such, the activity monitor 130 stores an indication of the consumption in the action data 135 associated with the user.

It will be understood that the action data 135 can take various forms. For example, and not by way of limitation, each activity instance (i.e., each instance of an activity related to the user) indicated in the action data 135 is represented by a predefined data structure. In some embodiments, for a particular activity instance, the data structure indicates a communication channel where the activity occurred, a time of the occurrence, a description of the activity (e.g., consumed, sent), and the applicable asset 170 (e.g., a particular content item 185). Further, some embodiments further include in the data structure a user identifier, whether the activity constitutes the meeting of a trigger condition, or other information utilized by the sequencing engine 140 or the analytics engine 150 as described herein. In some embodiments, the action data 135 is represented as a set of such data structures, such as in the form of a linked list, an array, or a text file including references to each such data structure associated with the user. It will be understood that various representations are appropriate and can be used with embodiments described herein.

In some embodiments, the action data 135 associated with a user includes not only activities of the user devices 105, such as opening an email, but also activities performed with respect to the user devices 105, such as sending an email regardless of whether that email was opened. Thus, each time the sequencing engine 140 initiates a content item 185 to be sent to the user, the activity monitor 130 adds an action instance to the action data 135 to describe the sending of the content item 185; further, each time the activity monitor 130 detects that the user has consumed an asset 170, such as a content item 185 or otherwise, the activity monitor 130 adds to the action data 135 an action instance describing such consumption. Thus, the action data 135 describes a history of activities related to the user and to the devices 105 associated with the user, such as content items 185 sent, content items 185 consumed, and other assets 170 consumed.

At block 215, the process 200 involves determining that the trigger condition has been met. Specifically, in some embodiments, the sequencing engine 140 performs this task based on the action data 135. If the action data 135 includes ones or more action instances that together constitute meeting of the trigger condition, then the sequencing engine 140 determines that the trigger condition has been met. In some embodiments, the trigger condition requires that a specific one or more content items 185 have been consumed or that some other asset 170 has been consumed, for example. In some cases in certain embodiments, the reading of a content item 185 itself meets a trigger condition, while in other cases, a trigger condition requires access to an asset outside of the content stream 180.

It will be understood that trigger conditions take various forms in various embodiments. For instance, a trigger condition is met when a device 105 of the user performs some activity or, alternatively, fails to perform some activity. For example, and not by way of limitation, a trigger condition requires following (e.g., by selecting) a hyperlink, visiting a website, posting on social media about a relevant entity (e.g., an entity associated with the transmission system 100), consuming an asset 170, failure to consume an asset 170, consuming a content item 185, failure to consume a content item 185, calling or emailing an entity (e.g., an entity associated with the transmission system 100), failing to call or email an entity, or expressing interest in information in the content stream 180 in a detectable manner. For another example, in some embodiments, a specific output of an ML model 155 (e.g., a score 160 that is at least a threshold score) based on the action data 135 meets a trigger condition. For yet another example, in some cases, the sending of a first content item 185 meets the trigger condition for the sending of a second content item 185, such that no specific activity on the user's part is necessary for the sending of the second content item 185.

At block 220, the process 200 involves determining, based on the action data, a second communication channel. For instance, in some embodiments, the sequencing engine 140 determines a second communication channel from among a set of available communication channels. The set of available communication channels includes, for example, one or more of the following: telephone call, email, chatbot on a website, coach mark on a website, or others. More specifically, for instance, the sequencing engine 140 maps the action data 135 of the user to a second communication channel. For example, the second communication channel differs from the communication channel through which the first content item 185 was delivered, but alternatively, the sequencing engine 140 maps the action data 135 to the same communication channel through which the first content item 185 was delivered. In some embodiments, the determination of the second communication channel is made in consultation with the analytics engine 150, as described above and in more detail below.

Although this example involves determining the second communication dynamically, more generally, certain embodiments determine a dynamic transmission characteristic for delivery of the second content item 185. For instance, the dynamic transmission characteristic is a communication channel, as in this example, or a delivery time.

In some embodiments, a content item 185 is stored in a format that is not preferred or not appropriate for transmission by way of a selected communication channel. For instance, if the second content item 185 is stored as textual data, and the second communication channel is direct voice mail, then the textual data is typically not transmissible in audio format appropriate for voice mail. In such a circumstance, some embodiments convert the applicable content item 185 into a format associated with the selected communication channel, or more specifically, in this example, the sequencing engine 140 converts the second content item 185 into audio format. Various mechanisms exist in the art for converting data from one format into another, and one or more of such mechanisms are used in certain embodiments.

At block 225, the process 200 involves triggering, or initiating, the second content item 185 to be delivered via the second communication channel. The specific mechanisms involved in triggering the second content item 185 to be delivered depends on the second communication channel. For example, if the second communication channel is a telephone call, then triggering delivery includes notifying personnel to place a telephone call to convey information in the second content item 185. For another example, if the second communication channel is email, then triggering delivery includes automatically transmitting an email that includes information in the second content item 185.

For yet another example, if the second communication channel is a chatbot on a web page, then triggering delivery includes injecting conditional code into the website so as to initiate the chatbot when the user visits the web page. Additionally or alternatively, if the activity monitor 130 detects that a device 105 of the user is presently active in a session, such as on the website or in a mobile application, then triggering delivery through a chatbot or digital agent includes initiating the chatbot or digital agent to interact with the user, via the device 105, during the present session. In some embodiments, when a chatbot is selected as a communication channel to be used, the chatbot is configured to present a content item 185 online. Additionally or alternatively, the chatbot is configured to guide the user, by way of a user device 105, to perform an activity that meets a trigger condition for the current content stream 180. For instance, the chatbot provides a coach mark (e.g., a visual indication displayed or overlaid on the web page or mobile application) that describes the activity. More generally, for instance, information provided by the chatbot is designed to move the user in a desired direction in the current content stream 180 or to move the user toward a more desirable content stream 180 than the current content stream 180.

Thus, as a result of the process 200 illustrated in FIG. 2, the transmission system 100 distributes data, in the form of the second content item 185, to a communication channel selected based on the action data 135. Thus, the communication channel is dynamically selected based on a history of activity related to the user.

Figure 3:
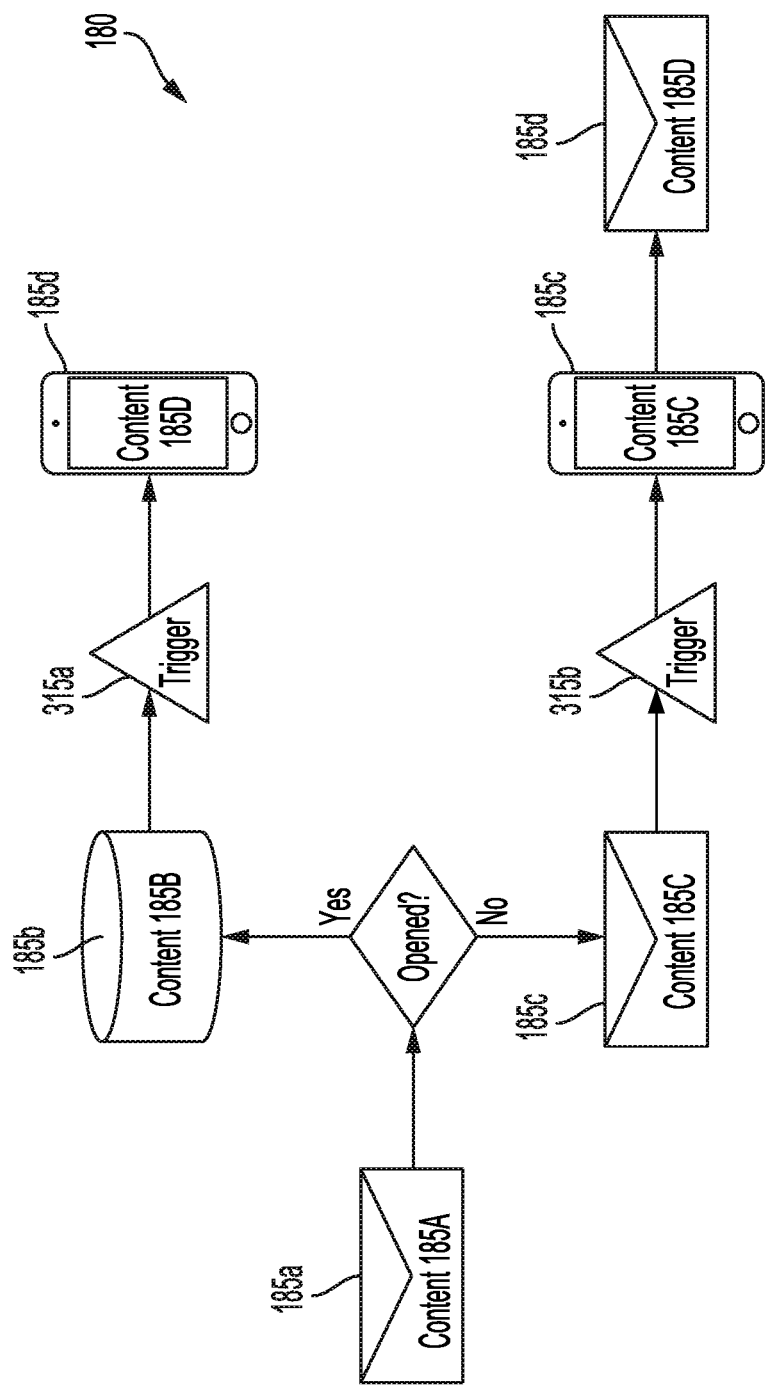
FIG. 3 depicts an example of dynamic delivery of content items in a content stream, according to certain embodiments of the present disclosure.

FIG. 3 depicts an example of dynamic delivery of content items 185 in a content stream 180, according to certain embodiments of the present disclosure. In some cases, FIG. 3 illustrates an instance of the process 200 described above with respect to FIG. 2. This example is provided to illustrate a potential application of the operations described above. As shown in FIG. 3, a particular content stream 180 includes four or more content items 185: Content 185A, Content 185B, Content 185C, and Content 185D (referred to collectively herein as "content items 185"). These content items 185 are transmittable via three or more communication channels: email, chatbot on a web page, or telephone call.

In this example, according to the rules of the content stream 180, Content 185A is sent to the user via email. Based on the rules of the content stream 180, Content 185B is transmitted if the email is opened; otherwise, Content 185C is transmitted. According to some embodiments, in either case, the sequencing engine 140 determines the communication channel by which such content item 185 is transmitted. In this example, if Content 185A was opened and thus deemed to be consumed, then the sequencing engine 140 determines a communication channel for Content 185B based on the action data 135 of the user. Specifically, the sequencing engine 140 determines that Content 185B should be delivered via a chatbot on a web page.

Various mechanisms exist to incorporate a content item 185 into a web page, and one or more of such mechanisms are used by embodiments described herein. For example, and not by way of limitation, a tag management system is used to incorporate a content item 185 into the website. Generally, a tag management system manages tags (i.e., code snippets) to integrate software into websites or other digital properties. Through a tag management system or other means, the sequencing engine 140 injects code into a website to cause a chatbot or digital agent to interact with the user during the user's current or future session on the website. For instance, the sequencing engine 140 injects conditional code such that, when the session is detected, the chatbot or digital agent initiates communication with the user to convey information in the content item 185.

In this example, after delivery of Content 185B, the sequencing engine 140 determines whether a first trigger condition 315a, referred to in FIG. 3 as a "trigger," is met. If the first trigger condition 315a is met, then Content 185D is next to be delivered according to the rules of the content stream 180. In some embodiments, however, the sequencing engine 140 selects a communication channel for Content 185D based on the action data 135. In this example, the selected communication channel is a telephone call, and thus, the sequencing engine 140 notifies personnel to contact the user via telephone to convey the information in Content 185D.

However, if the action data 135 indicates that Content 185A was not opened, and is thus not deemed to be consumed, then the rules of the content stream 180 require Content 185C to be transmitted to the user. Based on the action data 135, the sequencing engine 140 determines that Content 185C should be sent via email. If a second trigger condition 315b is met, then Content 185C is sent again. This time, in this example, the sequencing engine 140 once again determines a communication channel; specifically, the sequencing engine 140 decides to transmit Content 185C by way of a telephone call. As such, the sequencing engine 140 automatically notifies personnel to call the user, via a telephonic device 105 of the user, to convey the information in Content 185C. Additionally, the rules of the content stream 180 require Content 185D to be sent to the user, and the sequencing engine 140 decides, based on the action data 135, to transmit Content 185D to the user via email.

Although this example, as well as FIG. 2, refers to dynamic selection of a communication channel as determined by a machine-learning model 155 based on the action data 135, additionally or alternatively, the sequencing engine 140 dynamically selects a time for transmission of a content item 185. Further, some embodiments dynamically select a content stream 180, such that the content stream 180 applied to the user changes, potentially before all content items 185 have been sent.

Figure 4:
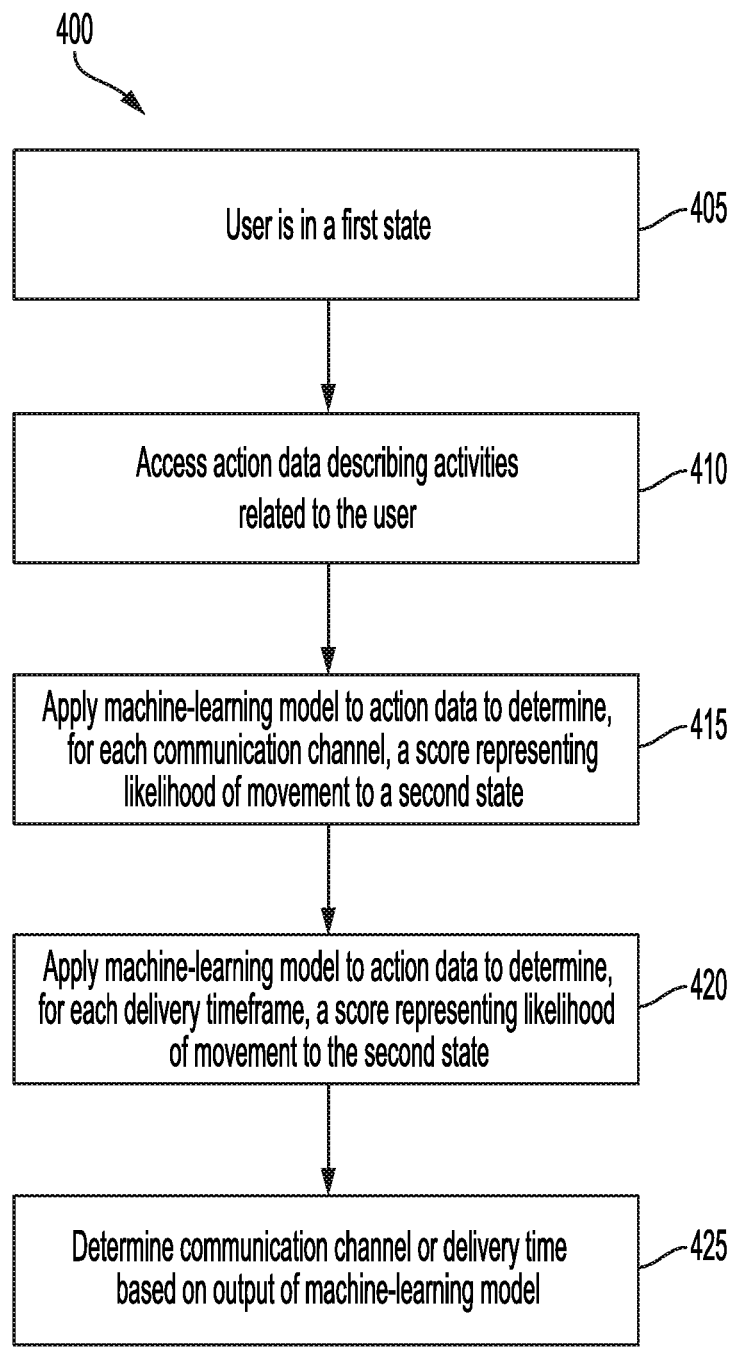
FIG. 4 depicts an example of a method of utilizing machine learning to determine a communication channel or a delivery time applicable to a content item, according to certain embodiments of the present disclosure.

FIG. 4 depicts an example of a process 400 for utilizing machine learning to determine a communication channel or a delivery time applicable to a content item 185, according to certain embodiments of the present disclosure. At block 405 of the process 400, the user device is deemed to be in a first state. As described above, in some embodiments, the content stream 180 applied to the user and associated devices 105 is selected based on the state of the user. Thus, in this example, based on the state of the user, the user has been assigned to a particular content stream 180 designed for users in that state.

At block 410, the process 400 involves accessing action data 135 describing activities related to the user. More specifically, in some embodiments, the sequencing engine 140 accesses the action data 135 and provides the action data 135 to the analytics engine 150, or the analytics engine 150 accesses the action data 135 directly.

At block 415, the process 400 involves applying an ML model 155 to the action data 135 to determine, for each available communication channel, a score 160 representing the likelihood of moving the user to a second state if a content item 185 is sent through that communication channel. For instance, the score 160 is a probability in some embodiments. As described above, the analytics engine 150 is or includes an ML model 155, in some embodiments. In this example, the ML model 155 inputs the action data 135 associated with the user and outputs a corresponding score 160 associated with each available communication channel. The score 160 associated with a particular communication channel represents the likelihood that sending the next content item 185 via that communication channel will move the user from the first state to a second state, which is a more desirable state. For example, given the above example regarding leading a user to prepare a computer for upgrade, the first state is for users who have not yet readied their computers, and the second state is for users who have. Thus, the score 160 associated with a communication channel indicates the likelihood that sending the next content item 185 via that communication channel will move the user to a state where the user's computer is ready for the upgrade. In other words, the score 160 is the likelihood that the user will ready his or her computer for upgrade.

At block 420, the process 400 involves applying an ML model 155 to the action data 135 to determine, for each available time, a score representing the likelihood of moving the user to the second state if a content item 185 is sent at that time. In some embodiments, the available times are pre-established. For example, and not by way of limitation, the times are relative and include one or more of the following: immediately, one hour from the present, at the next close of business, the following morning, one day from the present, one week from the present, and one month from the present. Additionally or alternatively, however, absolute times are used in some embodiments.

In some embodiments, when the ML model 155 is trained, each training set in the training data includes action data 135 as well as an indication of which of these times is deemed correct. For instance, if the training data represents historical instances of real action data 135, the indication of which time is correct is an indication which time led to the user associated with the action data 135 in the training set to move from the first state to the second state.

At block 425, the process 400 involves determining a communication channel or delivery time based on output from the ML model 155. More specifically, for instance, the sequencing engine 140 receives the output of the ML model 155, including one or more scores 160 related to the delivery time, the communication channel, or both, and the sequencing engine 140 selects a delivery time or communication channel aligned with the most desirable (e.g., highest) scores. For example, and not by way of limitation, the sequencing engine 140 selects the communication channel associated with the highest score 160, and the sequencing engine 140 selects the delivery time associated with the highest score 160. If that delivery time is relative, the delivery time is translated into an absolute time. In some embodiments, the sequencing engine 140 determines the next content item 185 to be sent according to the rules of the content stream 180. Thus, the sequencing engine 140 initiates transmission of the next content item 185 for the determined time on the determined communication channel.

As discussed above, in some embodiments, each time a relevant activity occurs within the transmission system 100 with respect to the user, the action data 135 associated with the user is modified to incorporate a new activity instance. Thus, the action data 135 associated with the user changes from time to time. In some embodiments, block 415, block 420, and block 425 are performed responsive to the action data 135 changing and, for instance, each time the action data 135 changes. As such, responsive to an activity related to the user (e.g., the user consumes a content item 185, the user performs an act that meets a trigger condition 315, or a content item 185 is transmitted to the user), the transmission system 100 determines a communication channel or a time for transmission of a content item 185. In some embodiments, the specific content item 185 to be transmitted via the determined communication channel, or at the determined time, is determined according to the rules of the content stream 180. In some embodiments, however, as described below, the applicable content stream 180 changes dynamically based on the action data 135 as well.

Figure 5:
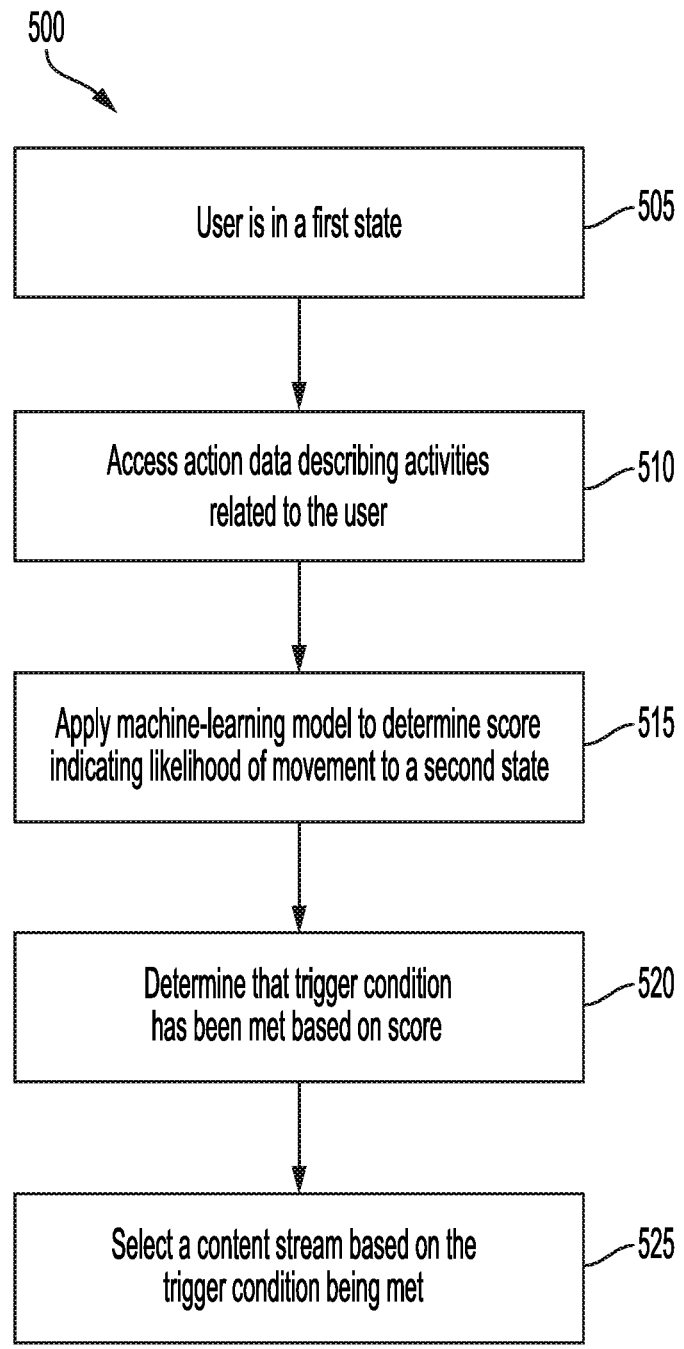
FIG. 5 depicts an example of a method of utilizing machine learning to select a content stream applicable to a user, according to certain embodiments of the present disclosure.

FIG. 5 depicts an example of a process 500 for utilizing machine learning to select a content stream 180 applicable to a user, according to certain embodiments of the present disclosure. At block 505 of the process 500, the user device is deemed to be in a first state. Thus, based on being in the first state, the user device has been assigned to a first content stream 180. In this example, a particular trigger condition 315 requires that the ML model 155 predicts (i.e., outputs) at least a threshold score, and in that case, the user is unassigned from the first content stream 180 and assigned to a second content stream 180 instead.

At block 510, the process 500 involves accessing action data 135 describing activities related to the user. More specifically, in some embodiments, the sequencing engine 140 accesses the action data 135 and provides the action data to the analytics engine 150, or the analytics engine 150 access the action data 135 directly.

At block 515, the process 500 involves applying an ML model 155 to the action data 135 to determine a score 160 representing a likelihood of movement from the first state to the second state. In this case, for instance, the ML model 155 was trained on training data including one or more training sets, where each training set includes action data 135 and an indication of whether the user was deemed to have moved from the first state to the second state. For example, a training set represents an actual historical instance in which a user was determined to have moved into the second state, and the past determination of movement between states was made manually by an expert who determined that the user met a set of requirements for the second state. Based on this training data, the ML model 155 was trained to input action data 135 and thus determine a score 160 representing the likelihood that the user moves to the second state.

At block 520, the process 500 involves determining that a trigger condition 315 of the first content stream 180 has been met. In this example, the trigger condition 315 requires that the score 160 output by the ML model 155 above meets a threshold score. Thus, to determine that the trigger condition 315 has been met, the sequencing engine 140 determines that the output score 160 is at least the threshold score.

At block 525, the process 500 involves selecting a content stream 180 based on the trigger condition 315 being met. More specifically, for instance, the sequencing engine 140 selects the second content stream 180 and thus assigns the user to the second content stream 180, responsive to the trigger condition 315 being met. Due to now being assigned to the second content stream 180, the content items 185 and rules of the second content stream 180 become applicable to the user. As such, changing the content stream 180 applicable to the user plays a role in determining which content item 185 is next to be transmitted to the user. In some embodiments, the sequencing engine 140 thus follows the rules of the second content stream 180 to determine which content item 185 to deliver to the user next.

Certain embodiments utilize a combination of the above processes or others, thereby applying machine learning to select a content stream 180 as well as to determine a communication channel or delivery time. For example, and not by way of limitation, when the action data 135 associated with a user changes, an ML model 155 is applied to the action data 135 to determine a content stream 180 applicable to the user. For instance, the selected content stream 180 is a current content stream 180 of the user or is a different content stream 180, thus resulting in unassigning the user from the current content stream 180 and assigning the user to the different content stream 180. The rules of the user's content stream 180 are applied to determine which content item 185 is next to be transmitted to the user. Further, one or more additional ML models 155 are applied to the action data 135 to determine a communication channel or a delivery time of the next content item 185. Additionally or alternatively, certain embodiments of the transmission system 100 utilize an ML model 155 to determine which content item 185 to send next from among the content items 185 in the current content stream 180. To this end, for instance, the ML model 155 inputs action data 135 and outputs a set of scores 160 including a score for each content item 185 in the content stream 180, and in some embodiments, the sequencing engine 140 selects the content item 185 associated with the highest output score 160. It will be understood that the above-described embodiments are combinable in various ways to apply machine learning to action data 135, thereby distributing content items 185 to the devices 105 of the user dynamically based on a history of activity related to the user and such devices 105.

Figure 6:
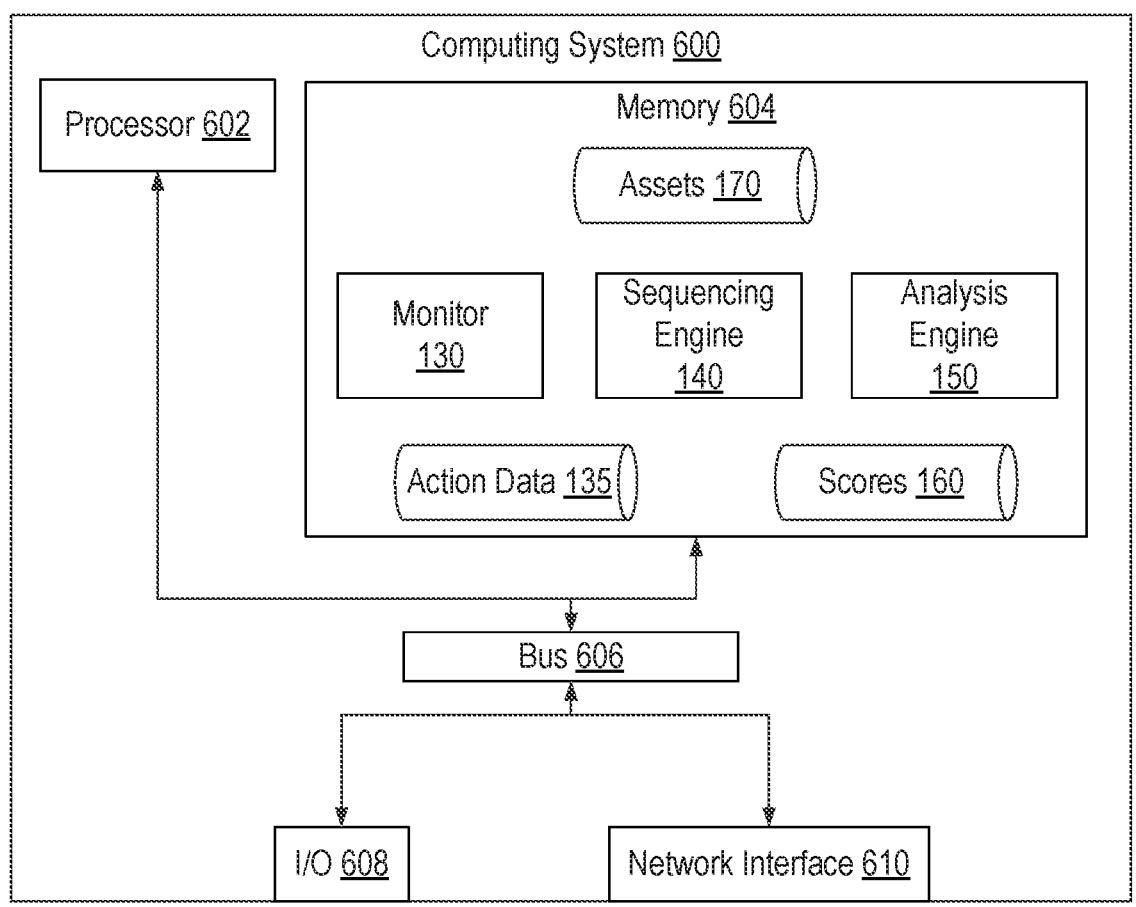
FIG. 6 depicts an example of a computing system that performs certain operations described herein, according to certain embodiments of the present disclosure.

Any suitable computing system or group of computing systems can be used for performing the operations described herein. For example, FIG. 6 depicts an example of a computing system 600 that performs certain operations described herein, according to certain embodiments of the present disclosure. The depicted example of a computing system 600 includes a processor 602 communicatively coupled to one or more memory devices 105. The processor 602 executes computer-executable program code stored in a memory device 105, accesses information stored in the memory device 105, or both. Examples of the processor 602 include a microprocessor, an application-specific integrated circuit ("ASIC"), a field-programmable gate array ("FPGA"), or any other suitable processing device. The processor 602 can include any number of processing devices, including a single processing device.

The memory device 105 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 600 may also include a number of external or internal devices, such as input or output devices. For example, the computing system 600 is shown with one or more input/output ("I/O") interfaces 608. An I/O interface 608 can receive input from input devices or provide output to output devices. One or more buses 606 are also included in the computing system 600. The bus 606 communicatively couples one or more components of a respective one of the computing system 600.

The computing system 600 executes program code that configures the processor 602 to perform one or more of the operations described herein. The program code includes, for example, the activity monitor 130, the sequencing engine 140, the analytics engine 150, or other suitable applications that perform one or more operations described herein. The program code may be resident in the memory device 105 or any suitable computer-readable medium and may be executed by the processor 602 or any other suitable processor. In some embodiments, the activity monitor 130, the sequencing engine 140, and the analytics engine 150 are stored in the memory device 105, as depicted in FIG. 6. In additional or alternative embodiments, one or more of the activity monitor 130, the sequencing engine 140, and the analytics engine 150 are stored in different memory devices of different computing systems. Further, in some embodiments, the web server 120 is stored in the memory device 105 as program code; additionally or alternatively, however, the web server 120 is implemented on a separate computer system. In some embodiments, as shown in FIG. 6, the assets 170, action data 135, and scores 160 are stored in the memory device 105 for access by the activity monitor 130, the sequencing engine 140, and the analytics engine 150.

In additional or alternative embodiments, some or all of the program code and data described above is stored in one or more other memory devices accessible via a data network, and the computing system 600 can access one or more of the activity monitor 130, the sequencing engine 140, the analytics engine 150, the assets 170, the action data 135, and the scores 160 in any suitable manner. For example, in some embodiments, the analytics engine 150 is executed on a different computer system, and the sequencing engine 140 and the analytics engine 150 communicate over the data network to enable the sequencing engine 140 to consult the ML model 155 of the analytics engine 150.

The computing system 600 also includes a network interface device 105. The network interface device 105 includes any device or group of devices suitable for establishing a wired or wireless data connection to one or more data networks. Non-limiting examples of the network interface device 105 include an Ethernet network adapter, a modem, and the like. The computing system 600 is able to communicate with one or more other computing devices (e.g., a computing device executing a relationship management tool 60) via a data network using the network interface device 105.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices perform operations comprising:
    accessing, by a sequencing engine, a content stream associated with one or more user devices associated with a user, the content stream having (i) multiple content items available to be provided to the one or more user devices and (ii) a trigger condition for providing at least one of the multiple content items;
    detecting, by the sequencing engine, that a first content item of the multiple content items has been consumed at the one or more user devices through a first communication channel;
    determining, by the sequencing engine, that the trigger condition has been met;
    determining, by the sequencing engine and via a machine-learning model applied to action data describing actions by the one or more user devices, a second communication channel from among two or more available communication channels for a second content item of the multiple content items;
    modifying, by the sequencing engine, code of a website to provide the second communication channel, wherein the modified code configures the second communication channel to perform one or more of i) presenting the second content item or ii) providing activity guidance indicating an additional trigger condition of the content stream; and
    triggering, by the sequencing engine, the second content item to be delivered to a particular user device of the one or more user devices via the second communication channel, responsive to the first content item being consumed and the trigger condition being met.

2. The method of claim 1, the operations further comprising:
    detecting that the one or more user devices have initiated a session within the second communication channel,
    wherein determining that the trigger condition has been met occurs during the session with the second communication channel, and
    wherein determining the second communication channel is performed responsive to the trigger condition being met during the session with the second communication channel.

3. The method of claim 1, wherein the content stream is targeted to an additional user associated with one or more additional user devices, and wherein the operations further comprise:
    determining that the first content item has not been consumed at the one or more additional user devices associated with the additional user; and
    determining a different communication channel based on determining that the first content item has not been consumed at the one or more additional user devices.

4. The method of claim 1, wherein detecting that the first content item has been consumed at the one or more user devices through the first communication channel comprises determining that an email that includes the first content item has been opened at the one or more user devices,
    wherein triggering the second content item to be delivered via the second communication channel comprises presenting the second content item via a chatbot or digital agent within the website that provides the second communication channel.

5. The method of claim 4, wherein presenting the second content item via the chatbot or the digital agent within the website comprises injecting, into the website, conditional code implementing the chatbot or the digital agent.

6. The method of claim 1, wherein the trigger condition is associated with a movement of the user between a first state and a second state within an online environment, and wherein determining that the trigger condition has been met comprises:
    accessing the action data describing the actions by the one or more user devices;
    applying a second machine-learning model to the action data and thereby computing a score representing a likelihood of the movement between the first state and the second state; and determining that the trigger condition has been met based on a comparison of the score to a threshold score.

7. The method of claim 1, wherein determining the second communication channel comprises:
accessing action data describing the actions by the one or more user devices;
applying the machine-learning model to the action data and thereby computing a score representing a likelihood of movement of the user between a first state and a second state; and
determining, based on the score, at least one of a delivery time and a selected communication channel for delivery of a second content.

8. The method of claim 1, the operations further comprising:
accessing an additional content stream having one or more additional content items that are different from the first content item and the second content item;
accessing the action data describing the actions by the one or more user devices within an online environment that is accessible via the second communication channel;
applying a second machine-learning model to the action data and thereby computing a score representing a likelihood of movement between a first state of the user and a second state of the user via the online environment;
selecting the additional content stream based on a comparison of the score to a threshold score; and
presenting the one or more additional content items, responsive to selecting the additional content stream.

9. A non-transitory computer-readable medium embodying program code for triggering content delivery, the program code comprising instructions that, when executed by a processor, cause the processor to perform operations comprising:
accessing a content stream associated with one or more user devices associated with a user, the content stream having (i) multiple content items available to be provided to the one or more user devices and (ii) a trigger condition for providing at least one of the multiple content items;
detecting that a first content item of the multiple content items has been consumed at the one or more user devices through a first communication channel;
determining that the trigger condition has been met;
determining, based on action data describing actions by the one or more user devices, a dynamic transmission characteristic for delivery of a second content item of the multiple content items; and
responsive to determining that a particular user device of the one or more user devices has an active session having the dynamic transmission characteristic, triggering the second content item to be delivered to the particular user device via the active session with the dynamic transmission characteristic, further responsive to the first content item being consumed and the trigger condition being met.

10. The non-transitory computer-readable medium of claim 9, wherein determining the dynamic transmission characteristic comprises determining a second communication channel for the second content item, and
wherein triggering the second content item to be delivered with the dynamic transmission characteristic comprises triggering the second content item to be delivered via the second communication channel.

11. The non-transitory computer-readable medium of claim 10, the operations further comprising:
detecting that the one or more user devices have initiated a session within the second communication channel,
wherein determining that the trigger condition has been met occurs during the session with the second communication channel, and
wherein determining the second communication channel is performed responsive to the trigger condition being met during the session with the second communication channel.

12. The non-transitory computer-readable medium of claim 10, wherein detecting that the first content item has been consumed at the one or more user devices through the first communication channel comprises determining that an email that includes the first content item has been opened at the one or more user devices,
wherein triggering the second content item to be delivered via the second communication channel comprises presenting the second content item via a chatbot or digital agent within a web site that is accessible via the active session.

13. The non-transitory computer-readable medium of claim 12, wherein presenting the second content item via the chatbot or the digital agent within the web site comprises injecting, into the website, conditional code implementing the chatbot or the digital agent.

14. The non-transitory computer-readable medium of claim 9, wherein the trigger condition is associated with a movement of the user between a first state and a second state within an online environment, and wherein determining that the trigger condition has been met comprises:
accessing the action data describing actions by the one or more user devices;
applying a machine-learning model to the action data and thereby computing a score representing a likelihood of the movement between the first state and the second state; and
determining that the trigger condition has been met based on a comparison of the score to a threshold score.

15. The non-transitory computer-readable medium of claim 9, where determining the dynamic transmission characteristic for delivery of the second content item comprises:
accessing the action data describing actions by the one or more user devices;
applying a machine-learning model to the action data and thereby computing a score representing a likelihood of movement of the user between a first state and a second state; and
determining, based on the score, at least one of a delivery time and a selected communication channel for delivery of the second content item.

16. The non-transitory computer-readable medium of claim 9, the operations further comprising:
accessing an additional content stream having one or more additional content items that are different from the first content item and the second content item;
accessing additional action data describing actions by the one or more user devices within an online environment that is accessible via the first communication channel;
applying a machine-learning model to the action data and thereby computing a score representing a likelihood of movement between a first state of the user and a second state of the user via the online environment;
selecting the additional content stream based on a comparison of the score to a threshold score; and
presenting the one or more additional content items, responsive to selecting the additional content stream.

17. A system for triggering content delivery, the system comprising:
- processing hardware configured for:
  - accessing a content stream associated with one or more user devices associated with a user, the content stream having (i) multiple content items available to be provided to the one or more user devices and (ii) a trigger condition for providing at least one of the multiple content items,
  - detecting that a first content item of the multiple content items has been consumed at the one or more user devices through a first communication channel, and
  - determining that the trigger condition has been met;
- a means for determining, based on action data describing actions by the one or more user devices, a second communication channel from among two or more available communication channels for a second content item of the multiple content items;
- a means for modifying code of a website to provide the second communication channel, wherein the modified code configures the second communication channel to perform one or more of i) presenting the second content item or ii) providing activity guidance indicating an additional trigger condition of the content stream; and
- a means for triggering the second content item to be delivered to a particular user device of the one or more user devices via the second communication channel, responsive to the first content item being consumed and the trigger condition being met.

18. The system of claim 17, wherein:
- the content stream is targeted to an additional user associated with one or more additional user devices,
- the processing hardware further configured for determining that the first content item has not been consumed at the one or more additional user devices associated with the additional user, and
- the system further comprises a means for determining a different communication channel based on determining that the first content item has not been consumed at the one or more additional user devices.

19. The system of claim 17, wherein triggering the second content item to be delivered via the second communication channel comprises:
- presenting the second content item via a chatbot or digital agent within the web site.

20. The system of claim 17, further comprising:
- a means for accessing the action data describing the actions by the one or more user devices;
- a means for applying a machine-learning model to the action data and thereby computing a score representing a likelihood of movement of the user between a first state and a second state; and
- a means for determining, based on the score, at least one of a delivery time and a selected communication channel for delivery of a second content.

* * * * *